Nov. 26, 1946.    C. A. DE GIERS    2,411,712
ELECTRICAL TOTALIZING SYSTEM
Filed June 12, 1942
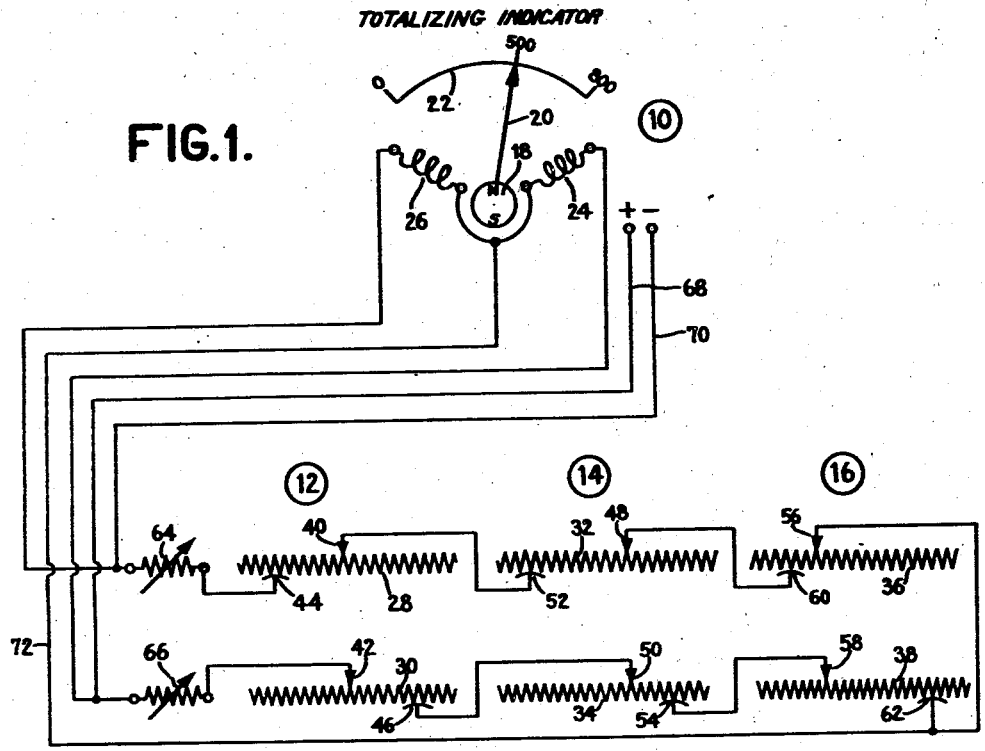
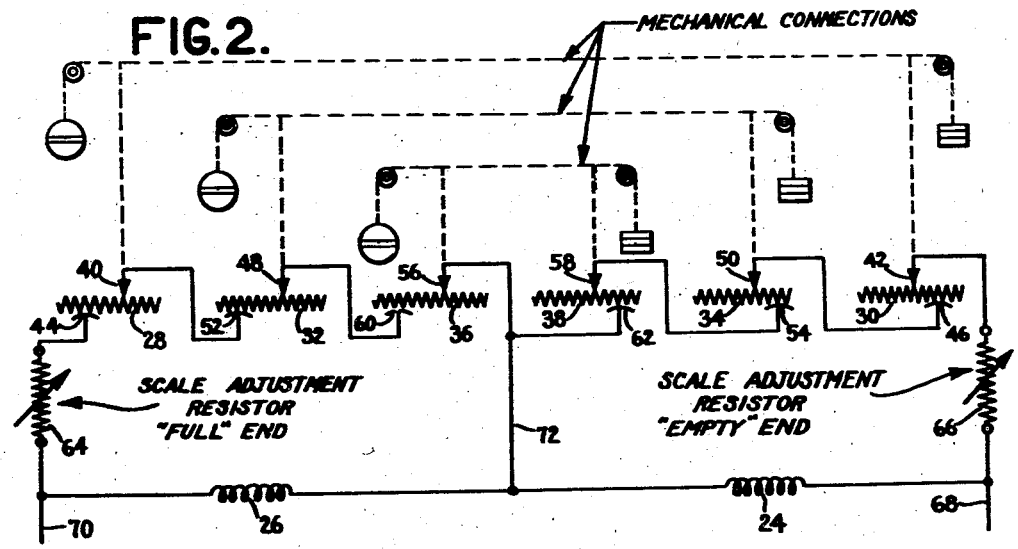
INVENTOR
Clarence A. de Giers
BY John C. Kerr
ATTORNEY Patented Nov. 26, 1946

2,411,712

UNITED STATES PATENT OFFICE 2,411,712

ELECTRICAL TOTALIZING SYSTEM

Clarence A. de Giers, Forest Hills, N. Y., assignor to The Liquidometer Corporation, Long Island City, N. Y., a corporation of Delaware Application June 12, 1942, Serial No. 446,765

6 Claims. (Cl. 73—313)

This invention relates to electrical totalizing and telemetric systems.

One of the objects of the invention is to provide an electrical system or combination of instrumentalities for automatically totalizing a number of variables such, for example, as the total number of gallons of liquid in a number of individual tanks.

Another object is to provide a system of the class described wherein the total is indicated at a distance, and in which the receiving station and the several transmitting stations may be widely separated, each from the others.

Other objects and advantages of my invention will be stated hereinafter or will appear to those skilled in the art upon reading the following description of the invention and of the manner and process of making, constructing, and using it, and I shall also explain herein what I now believe to be the principle thereof, and the best mode in which I have contemplated applying that principle.

Desiring to have it understood that my invention may be carried out by other means and with other apparatus, and that it may be used in other environments and for other purposes, I shall now proceed to describe what I now consider to be a preferred form of apparatus for practicing the invention.

Referring to the drawing:

Fig. 1 is a diagrammatic view showing the electrical connections of systems embodying my invention, and Fig. 2 is a somewhat diagrammatic fragmentary view showing the same electrical systems and also showing the transmitter operating apparatus.

The system illustrated includes a receiving station 10, and a plurality of transmitting stations 12, 14, 16. At the indicating station there is located an indicating instrument of the ratio type. This instrument, as shown, has a rotor 18 which is made of "Alnico" and permanently poled across a diameter and is carried by the shaft to which a pointer 20 is secured; a stationary scale 22 being provided for the pointer. Two stationary deflecting coils 24, 26 are mounted with their flux axes at right angles to the axis of the rotor 18; there being an angle of 120° between the flux axes of the coils. The angular position of the rotor 18, and consequently the pointer 20, will be determined by the relative strength of the currents in the coils 24, 26. In other words, the rotor position will be determined by the resultant of the magnetic fluxes set up by the coils 24, 26. For fuller disclosure and details of a satisfactory form of such indicating instrument, reference may be had to the disclosure of the following patent upon which disclosure I rely as though it were actually repeated here: United States Letters Patent No. 2,339,021, granted January 11, 1943, to Frederick J. Lingel, for "Electrical translating instruments."

The coils 24, 26, the rotor 18, and the pointer 20, shown and described herein correspond, respectively, to coils 32, 32, rotor 10, and the pointer 26, shown and described in the cited Patent No. 2,339,021. As stated, the other parts and features of construction of the complete indicator hereof are shown in the said patent. Other forms of indicating instrument may, however, be employed.

Each of the transmitting stations 12, 14, 16 has a plurality of variable impedances, which may be variable ohmic resistances 28, 30; 32, 34; 36, 38; respectively. Each of the impedances (resistances) is provided with a pair of sliding contacts, designated 40, 42, 44, 46; 48, 50, 52, 54; and 56, 58, 60, 62; respectively. The sliding contacts 40, 42 are simultaneously positioned by and in accordance with the float in a tank at station 12. When the float moves toward "empty" position the contacts 40, 42 are thereby moved to the left and when the float moves toward "full" position, the contacts 40, 42 are thereby moved to the right. The contacts 48, 50 are similarly operated by the float in a tank at station 14; and the contacts 56, 58 are similarly operated by the float in a tank at station 16. The contacts 44, 46; 52, 54; and 60, 62; are manually settable contacts, whose purpose will presently appear.

The resistances 28—32—36—38—34—30 are electrically connected in series, across a suitable source of E. M. F., such as a D. C. line 68, 70; manually adjustable end resistances 64, 66 being provided for a purpose also presently appearing. The coils 24, 26 are connected in series across the same line 68, 70 and the junction of the two coils 24, 26 is electrically connected to sliding contacts 56, 62, above described, by a conductor 72.

Before the system is used, the following adjustments are made, if necessary. With the float at station 12 in its lowest or empty position, the contact 40 is manually adjusted until there is zero resistance between the contacts 40 and 44. The contacts 40, 44 will now be in their extreme left hand positions. The float at station 12 is now raised to its highest or full position and the contact 46 is manually adjusted until there is zero resistance between the contacts 42, 46. The contacts 42, 46 are now in their extreme right hand position. Similar individual adjustments are made at transmitter stations 14 and 16.

It will be assumed that the travel of the float at any transmitting station is the same as that at any other transmitting station, from empty to full position, but that the tank at station 12 has a capacity of 100 gallons; that at station 14 has a capacity of 200 gallons; and that at station 16 has a capacity of 500 gallons. In this case, the resistance 28 between the contacts 40 and 44 when the tank at station 12 is full should be say about 100 ohms; the resistance 30 between the contacts 42 and 46 should be about 100 ohms when the same tank is empty; the resistance 32 between the contacts 48 and 52 should be about 200 ohms when the tank at station 14 is full; the resistance 34 between the contacts 50 and 54 should be about 200 ohms when the same tank is empty; the resistance 36 between the contacts 56 and 60 should be about 500 ohms when the tank at station 16 is full; and the resistance 38 between the contacts 58 and 62 should be about 500 ohms when the last mentioned tank is empty. Each manually adjustable end resistor 64, 66 should preferably be about $$\frac{16.8}{201}$$

times the total resistance of the transmitting stations; in the present case $$\frac{16.8}{201}$$

times (500+200+100) which is equal to about 66.9 ohms.

After the above described individual adjustments at the transmitting stations have been effected, the following additional over-all adjustments are made, if necessary. All of the floats are placed in their lowest, i. e., empty, position. The resistance 66 is now manually adjusted until the pointer 20 reads zero, or "empty" on the scale 22. All of the floats are then moved to their uppermost, i. e., "full" position. The resistance 64 is now manually adjusted until the pointer 20 reads 800, or "full" on the scale 22. This process may be repeated to re-check the "empty" and "full" positions.

With the system in operation, and after the foregoing adjustments have been made, the pointer 20 will at all times accurately indicate upon the scale 22 the total number of gallons in the three tanks at the three transmitting stations 12, 14, 16. The angular position of the rotor or armature 18, and its pointer 20, is at all times determined by the relative strengths of the magnetic fields set up by the coils or solenoids 24, 26, and the relative strengths of those magnetic fields is determined by the relative strengths of the voltages impressed across the two coils. The combination of controlling resistances 64—28—32—36—38—34—30—66 and their electrical connections constitutes, in effect, a potentiometer in which the total resistance from conductor 68 to conductor 70 is constant, regardless of the positions of any of the floats and the contacts which they operate. The ratio of the voltages across the coils 24 and 26 varies and is dependent upon the positions of the floats and the contacts which they operate. When any float moves to increase the resistance between the points 44 and 56, it simultaneously causes the resistance between the points 42 and 62 to decrease by the same amount.

Also when any float moves to decrease the resistance between the points 44 and 56, it simultaneously causes the resistance between the points 42 and 62 to increase by the same amount. Thus, suppose that all of the tanks are empty, and that we begin to fill the tank at station 12. As the float at station 12 rises, the float-operated contact 40 is thereby moved to the right (as seen on the drawing) to increase the resistance 28 between the contacts 40—44, and the contact 42 is moved to the right by the same float to decrease the resistance 30 between the contacts 42—46 by the same amount. As the liquid continues to rise the pointer 20 therefore correspondingly moves to the right until the tank at station 12 is full and the pointer indicates "100" gallons on the scale 22. If we now begin to fill the tank at station 14, the float-operated contacts 48 and 50 at that station both move to the right and when that tank is full, the pointer 20 will indicate "300" gallons, i. e., the sum of 100 plus 200 gallons, on the scale 22. If we now begin to fill the tank at station 16, the float-operated contacts 56 and 58 at that station both move to the right and when that tank is full, the pointer 20 will indicate "800" gallons, i. e., the sum of 100+200+500 gallons, on the scale 22. It will now be understood, of course, that regardless of the relative positions of the floats at any time, the instrument 18—20—22—24—26 will accurately indicate the correct total of gallons at that time. Thus, if the tank at station 12 is one-quarter full, that at station 14 is one-half full, and that at station 16 is three-fifths full; the indicator will correctly indicate the total gallons, i. e., "425" gallons, which is the sum of $$\frac{100}{4}+\frac{200}{2}+\frac{3\times 500}{5}$$

While my invention is particularly adapted to totalize gallons, as above described, it may be also employed to totalize other variables such as distances, temperatures, etc., by utilizing suitable apparatus for automatically operating the contacts 40, 42, 48, 50, 56, 58 at the various transmitting stations. Furthermore, while other forms of indicating couples, such as recorders, may be employed, I now prefer to use the indicating instrument shown and described.

The transmitting stations may be located at distances one from another, and the indicating instrument may be located remotely from one, or more, or all, of the transmitting stations.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted, without interfering with the more general results outlined, and the invention extends to such use within the scope of the appended claims.

What I claim is:

1. A system of the class described comprising in combination, a group of serially connected variable resistances, a second group of serially connected variable resistances, an indicating instrument having a plurality of deflecting coils, one of said coils being connected across the first mentioned group of resistances and another of said coils being connected across the second mentioned group of resistances, a transmitting instrument including a variable resistance of the first mentioned group and a similar variable resistance of the second mentioned group, said transmitting instrument having means operable in accordance with the value of a variable for simultaneously increasing the resistance of one of said last mentioned resistances and decreasing the resistance of the other of said last mentioned resistances by the same amount, and a second transmitting instrument including another variable resistance of the first mentioned group and still another similar variable resistance of the second mentioned group, said last mentioned transmitting instrument having means operable in accordance with the value of another variable for simultaneously increasing the resistance of one of said last mentioned resistances and decreasing the resistance of the other of said last mentioned resistances by the same amount.

2. A combination as set forth in claim 1 and in which the variables are quantities of liquids and in which each transmitting instrument is float-operated.

3. A telemetering system, comprising a single receiving instrument having a plurality of angularly spaced coils and an indicator, the indicating positions of which are determined by a resultant field, of which the magnetic fields produced by said coils are components, a plurality of transmitters for transmitting the instantaneous values of variables having different maximums and electrically connected to said receiving instrument so that the latter indicates the sum of the indications of said transmitters, each of said transmitters having two substantially similar resistances and a contact member respectively associated with each of said resistances and mechanically connected for simultaneous movement throughout a predetermined range peculiar to each transmitter respectively, electrical connections between said transmitters and with said receiving instrument to connect one of the resistances of each transmitter in series in one group and the other resistance of each transmitter in series in another group, electrical connections between one end of said one group and one end of said other group and to said receiving instrument, electrical connections between the free ends of said groups respectively and the receiving instrument, and a source of E. M. F. connected across said free ends of said groups, the aforesaid connections being so constructed and arranged that movements of said contact members in any one of said transmitters will increase the resistance in the series connection in one of said groups and will decrease the resistance in the series connection in the other of said groups by substantially the same amount.

4. A telemetering system, comprising a single receiving instrument having a plurality of angularly spaced coils and an indicator, the indicating positions of which are determined by a resultant field, of which the magnetic fields produced by said coils are components, a plurality of transmitters for transmitting the instantaneous values of variables having different maximums and electrically connected to said receiving instrument so that the latter indicates the sum of the indications of said transmitters, each of said transmitters having two substantially similar resistances and a contact member respectively associated with each of said resistances and mechanically connected for simultaneous movement throughout a predetermined range peculiar to said transmitters respectively, electrical connections between said transmitters and with said receiving instrument to connect one of the resistances of each transmitter in series in one group and the other resistance of each transmitter in series in another group, electrical connections between one end of said one group and one end of said other group and to said receiving instrument, electrical connections between the free ends of said groups respectively and the receiving instrument, a source of E. M. F. connected across said free ends of said groups, the aforesaid connections being so constructed and arranged that movements of said contact members in any one of said transmitters will increase the resistance in the series connection in one of said groups and will decrease the resistance in the series connection in the other of said groups by substantially the same amount, and means included in the connections aforesaid for manually adjustably varying the connection point to each of the transmitter resistances other than that through said respectively associated contact members so as to calibrate each transmitter in accordance with the maximum total of the variable quantity to be transmitted thereby.

5. A telemetering system for indicating on a single indicating instrument the total of the liquid contents of a plurality of tanks, comprising a single receiving and indicating instrument having a plurality of angularly spaced coils and an indicator, the indicating positions of which are determined by a resultant field, of which the magnetic fields produced by said coils are components, a plurality of transmitters respectively associated with each of said tanks, float means in each of said tanks responsive to the level of liquid therein, each of said transmitters having two substantially similar resistances and a contact member respectively associated with each of said resistances, means responsive to said float means for mechanically moving said contact members in respect to said resistances, electrical connections between said transmitters and said receiving instrument to connect one of the resistances of each transmitter in series in one group and the other resistance of each transmitter in series in another group, electrical connections between one end of said one group and one end of said other group and to said receiving instrument, electrical connections between the free ends of said groups respectively and said receiving instrument, and a source of E. M. F. connected across said free ends of said groups, the aforesaid connections being so constructed and arranged that movement of said contact members in any one of said transmitters will increase the resistance in the series connection in one of said groups and will decrease the resistance in the series connection in the other of said groups.

6. A telemetering system for indicating on a single indicating instrument the total of the liquid contents of a plurality of tanks, comprising a single receiving and indicating instrument having a plurality of angularly spaced coils and an indicator, the indicating positions of which are determined by a resultant field, of which the magnetic fields produced by said coils are components, a plurality of transmitters respectively associated with each of said tanks, means in each tank responsive to the liquid contents thereof for operating said transmitters respectively, each of said transmitters having two similar resistances and a contact member associated with each of said resistances and mechanically connected for simultaneous movement throughout a predetermined range peculiar to each transmitter respectively and determined by and in accordance with the total contents of the respectively associated tank, electrical connections between said transmitters and said receiving instrument to connect one of the resistances of each transmitter in series in one group and the other resistance of each transmitter in series in another group, electrical connections between one end of said one group and one end of said other group and to said receiving instrument, electrical connections between the free ends of said groups respectively and said receiving instrument, and a source of E. M. F. connected across said free ends of said groups, the aforesaid connections being so constructed and arranged that movement of said contact members in one of said transmitters in response to variation of the contents of the associated tank will increase the resistance in the series connection in one of said groups and will correspondingly decrease the resistance in the series connection in the other of said groups.

CLARENCE A. DE GIERS.